(12) United States Patent
Eardley (10) Patent No.: US 9,694,483 B2
(45) Date of Patent: Jul. 4, 2017

(54) ADAPTER FOR TRANSFERRING ELECTRICAL SIGNALS TO PNEUMATIC TOOL

(71) Applicant: Ingersoll-Rand Company, Davidson, NC (US)

(72) Inventor: Edward Charles Eardley, Easton, PA (US)

(73) Assignee: Ingersoll-Rand Company, Davidson, NC (US)

( * ) Notice: Subject to any disclaimer, the term of this patent is extended or adjusted under 35 U.S.C. 154(b) by 856 days.

(21) Appl. No.: 13/799,678

(22) Filed: Mar. 13, 2013

(65) Prior Publication Data

US 2014/0262391 A1   Sep. 18, 2014

(51) Int. Cl.
| | |
|---|---|
| *B25F 5/00* | (2006.01) |
| *B25F 5/02* | (2006.01) |
| *H02J 7/00* | (2006.01) |

(52) U.S. Cl.
CPC .............. *B25F 5/00* (2013.01); *H02J 7/0044* (2013.01)

(58) Field of Classification Search
CPC ... B25F 5/02; B25F 5/00; H02J 7/0068; H02J 7/00; H02J 7/042; H02J 7/0063; H02J 7/0044; B25C 1/04; B25C 1/047
USPC ...................................... 173/46, 20; 320/107
See application file for complete search history.

(56) References Cited

U.S. PATENT DOCUMENTS

| | | | | |
|---|---|---|---|---|
| 4,522,270 A | * | 6/1985 | Kishi | B23B 45/001 173/170 |
| 4,805,404 A | * | 2/1989 | Dupin | B25B 23/1456 60/409 |
| 5,259,100 A | | 11/1993 | Takahashi | |
| 5,533,843 A | * | 7/1996 | Chung | A45C 5/03 206/349 |
| 6,817,495 B1 | | 11/2004 | Luck | |
| 6,941,693 B2 | | 9/2005 | Rice et al. | |
| 7,494,035 B2 | | 2/2009 | Weaver et al. | |

(Continued)

FOREIGN PATENT DOCUMENTS

| | | | |
|---|---|---|---|
| GB | 2 418 252 A | 3/2006 | |
| JP | WO 2013014916 A2 * | 1/2013 | ............... B25F 5/02 |
| WO | 2007/141578 A2 | 12/2007 | |

OTHER PUBLICATIONS

QX Series Cordless Precision Screwdriver brochure, www.ingersollrandproducts.com, 8 pages.

*Primary Examiner* — Michelle Lopez
(74) *Attorney, Agent, or Firm* — Barnes & Thornburg LLP (57) ABSTRACT

In one illustrative embodiment, an adapter for transferring electrical signals to a pneumatic tool may comprise a housing having a tool interface and a charger interface, the tool interface shaped to receive a portion of the pneumatic tool, the charger interface shaped to be received by a charger unit that is configured for charging a battery of an electric tool, a tool connector disposed at the tool interface and configured to be removably coupled to electronics of the pneumatic tool, a charger connector disposed at the charger interface and configured to be removably coupled to electronics of the charger unit, and an adapter circuit disposed within the housing and coupled to both the tool connector and the charger connector, wherein the adapter circuit is configured to receive a first power signal via the charger connector and to supply a second power signal via the tool connector.

9 Claims, 4 Drawing Sheets

(56) References Cited

U.S. PATENT DOCUMENTS

| | | | |
|---|---|---|---|
| 7,557,534 B2 * | 7/2009 | Uehlein-Proctor | H02J 7/0045 320/107 |
| 7,629,766 B2 * | 12/2009 | Sadow | H02J 7/0044 173/217 |
| 7,770,658 B2 * | 8/2010 | Ito | B23P 19/066 173/1 |
| 2002/0158102 A1 * | 10/2002 | Patton | B25C 1/04 227/8 |
| 2008/0110654 A1 | 5/2008 | Hsieh | |
| 2009/0096430 A1 * | 4/2009 | Van Der Linde | H01H 13/18 320/166 |
| 2010/0039070 A1 | 2/2010 | Hargett | |
| 2011/0067895 A1 | 3/2011 | Nobe et al. | |

\* cited by examiner

FIG. 5

ADAPTER FOR TRANSFERRING ELECTRICAL SIGNALS TO PNEUMATIC TOOL

TECHNICAL FIELD

The present disclosure relates, generally, to an adapter for a pneumatic tool and, more particularly, to an adapter for transferring electrical signals to and/or from a pneumatic tool.

BACKGROUND

A power tool may include electronics that monitor and/or control usage of the power tool. By way of example, these electronics may monitor and/or control an output speed of the power tool, an output torque of the power tool, and/or an amount of time the power tool is used. As such, the electronics may produce data associated with the usage of the power tool that may be used by an operator, a customer, a service center, and others. In an electrically powered tool, the power source used to energize an electric motor of the power tool (e.g., mains electricity or a battery) may also be used to power the electronics that monitor and/or control usage of the power tool.

SUMMARY

According to one aspect, an adapter for transferring electrical signals to a pneumatic tool may comprise a housing, a tool connector, a charger connector, and an adapter circuit. The housing may have a tool interface and a charger interface. The tool interface may be shaped to receive a portion of the pneumatic tool. The charger interface may be shaped to be received by a charger unit that is configured for charging a battery of an electric tool. The tool connector may be disposed at the tool interface and may be configured to be removably coupled to electronics of the pneumatic tool. The charger connector may be disposed at the charger interface and may be configured to be removably coupled to electronics of the charger unit. The adapter circuit may be disposed within the housing and may be coupled to both the tool connector and the charger connector. The adapter circuit may be configured to receive a first power signal via the charger connector and to supply a second power signal via the tool connector.

In some embodiments, the second power signal may be the first power signal. In other embodiments, the adapter circuit may include a transformer, the first power signal may have a first magnitude, and the second power signal may have a second magnitude that is different than the first magnitude. In still other embodiments, the adapter circuit may include an inverter, the first power signal may be a direct current power signal, and the second power signal may be an alternating current power signal.

In some embodiments, the adapter circuit may be configured to receive a first data signal from the electronics of the pneumatic tool via the tool connector. The adapter circuit may be configured to transmit the first data signal to a computing device. The adapter circuit may be configured to receive a second data signal from the computing device. The adapter circuit may be configured to transmit the second data signal to the electronics of the pneumatic tool via the tool connector. The adapter circuit may include a wireless network interface configured to wirelessly transmit the first data signal to the computing device and to wirelessly receive the second data signal from the computing device. The adapter circuit may include a memory device configured to store data associated with at least one of the first and the second data signals.

In some embodiments, the charger interface may include a latch and a release. The latch may be configured to lock the adapter to the charger unit when the charger interface is received by the charger unit. The release may be configured to unlock the adapter from the charger unit when activated.

According to another aspect, an adapter for transferring electrical signals to a pneumatic tool may comprise a tool connector, a charger connector, a charge transfer circuit, and a data transfer circuit. The tool connector may be configured to be removably coupled to electronics of the pneumatic tool. The charger connector may be configured to be removably coupled to electronics of a charger unit that is configured for charging a battery of an electric tool. The charge transfer circuit may be coupled to the tool connector and to the charger connector. The charge transfer circuit may be configured to communicate power signals from the charger unit to the electronics of the pneumatic tool. The data transfer circuit may be coupled to the tool connector. The data transfer circuit may be configured to communicate data signals between a computing device and the electronics of the pneumatic tool.

In some embodiments, the data transfer circuit may include a wireless network interface configured to wirelessly communicate the data signals with the computing device. In other embodiments, the adapter may include a data connector configured to be removably coupled to the computing device. The data transfer circuit may be coupled to the data connector and may be configured to communicate the data signals via the data connector.

In some embodiments, the adapter may include a memory device coupled to the data transfer circuit and configured to store data associated with the data signals. In some embodiments, the data transfer circuit may be configured to communicate data stored on the memory device to the computing device via the data connector and to the electronics of the pneumatic tool via the tool connector.

In some embodiments, the charge circuit may be configured to detect a status of a rechargeable power storage of the electronics of the pneumatic tool via the tool connector. The adapter may include a visual indicator representing the status of the rechargeable power storage of the electronics of the pneumatic tool.

According to yet another aspect, a tool system may comprise a pneumatic tool, a charger unit, and an adapter. The pneumatic tool may include a pneumatic motor and electronics configured to monitor usage of the pneumatic tool. The electronics may include a rechargeable power storage. The charger unit may be configured for charging a battery used to power an electric motor of an electric tool. The adapter may include a charger connector and a tool connector. The charger connector may be removably coupled to the charger unit. The tool connector may be removably coupled to the electronics of the pneumatic tool. The adapter may be configured to receive a first power signal via the charger connector and to supply a second power signal to the rechargeable power storage via the tool connector.

In some embodiments, the adapter may include a visual indicator representing a status of the rechargeable power storage. The adapter may be configured to receive a first data signal from the electronics of the pneumatic tool via the tool connector and to transmit the first data signal to a computing device. The adapter may be configured to receive a second data signal from the computing device and to transmit the second data signal to the electronics of the pneumatic tool via the tool connector. The adapter may include a wireless network interface configured to wirelessly transmit the first data signal to the computing device and to wirelessly receive the second data signal from the computing device.

BRIEF DESCRIPTIONS OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
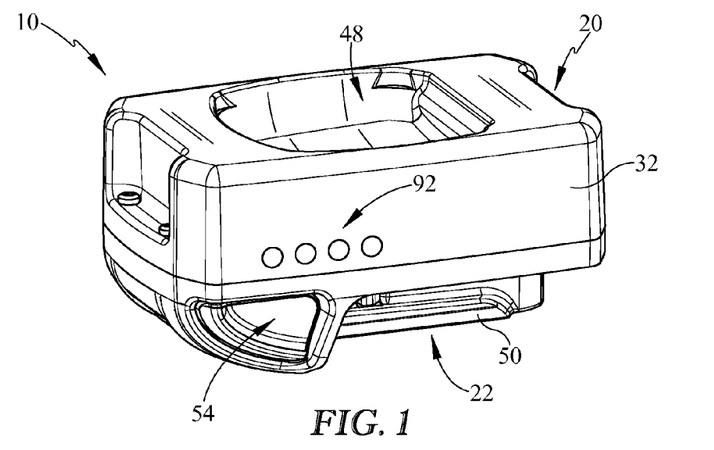
FIG. 1 illustrates one embodiment of an adapter for transferring electric signals to and/or from a pneumatic tool.
Figure 2:
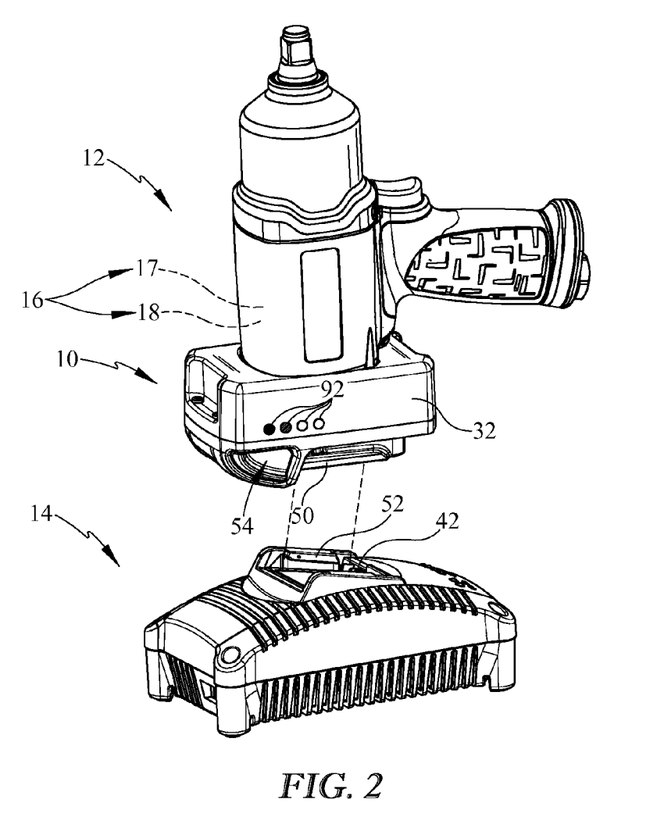
FIG. 2 illustrates the adapter of FIG. 1 in relation to a pneumatic tool and to a charger unit configured for charging a battery of an electric tool.
Figure 3:
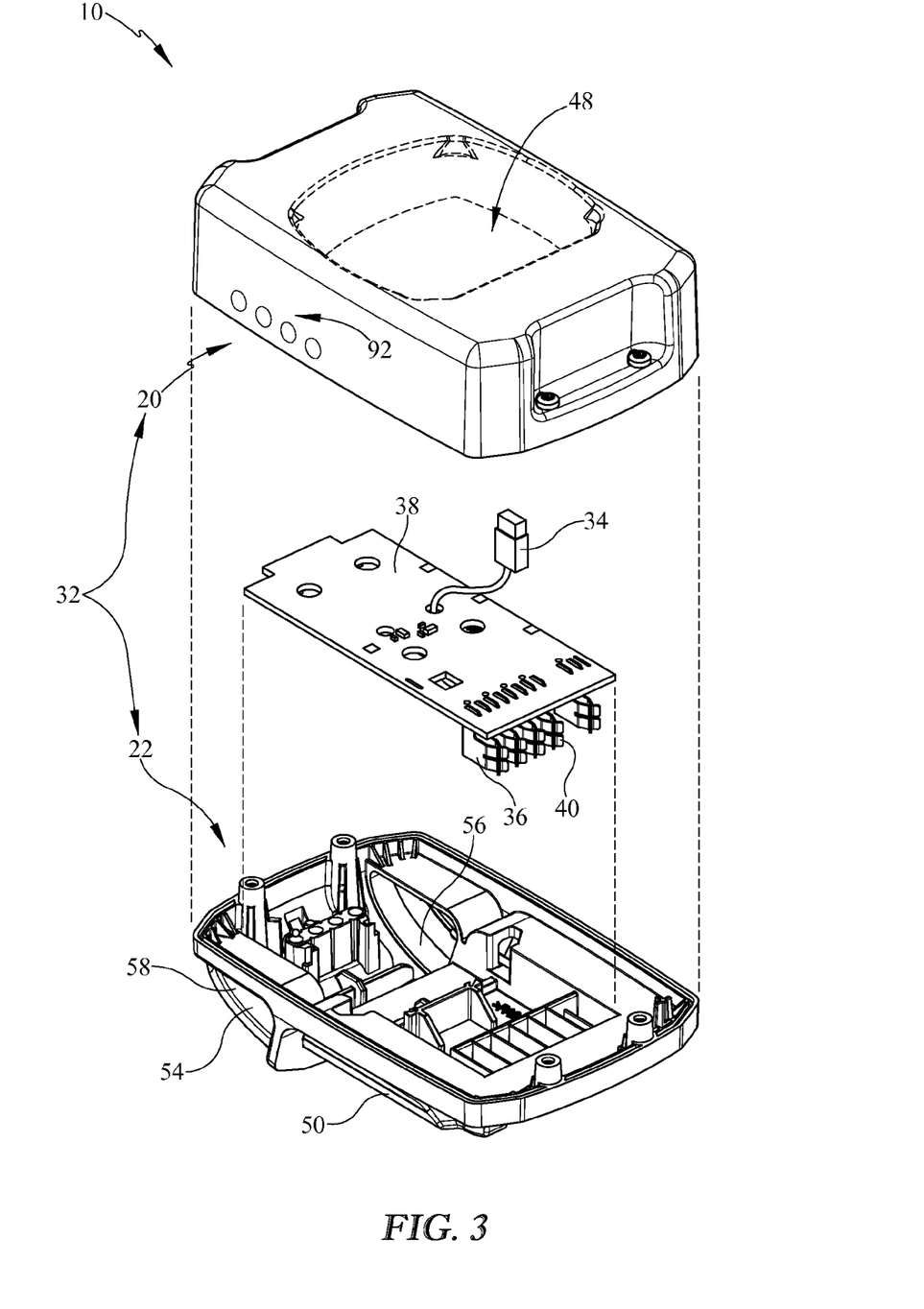
FIG. 3 is a partially exploded view of the adapter of FIG. 1.

Referring now to FIGS. 1-3, one illustrative embodiment of an adapter 10 for transferring electric signals to and/or from a pneumatic tool 12 is shown. The adapter 10 includes a tool interface 20 and a charger interface 22. In the illustrative embodiment, the tool interface 20 of the adapter 10 is configured to receive a portion of the pneumatic tool 12, as shown in FIG. 2. It is contemplated that, in other embodiments, the adapter 10 may be used with any type of non-electrically powered tool. The charger interface 22 of the adapter 10 is configured to be received by a charger unit 14, as shown in FIG. 2. The charger unit 14 may be any device that is designed for charging a battery (e.g., a battery that is used to energize an electric motor of an electrically powered tool). By way of example, the charger unit 14 may be illustratively embodied as an Ingersoll-Rand IQ$^{V20}$ Series Lithium-Ion Battery Charger, commercially available from Ingersoll-Rand Company of Davidson, N.C. It will be appreciated that the adapter 10 may be configured to be used with any suitable charger unit 14.

The pneumatic tool 12 includes a pneumatic motor (not shown) that is energized by a pressurized fluid (e.g., by connecting the pneumatic tool to a source of compressed air via a hose). Additionally, the pneumatic tool 12 includes electronics 16 for enhancing the performance of the pneumatic tool 12. By way of example, the electronics 16 may control an output speed or an output torque of the pneumatic tool 12. In the illustrative embodiment, the electronics 16 monitor usage (e.g., output speed, output torque, operating time, and the like) of the pneumatic tool 12.

In the illustrative embodiment, the electronics 16 of the pneumatic tool 12 include a monitoring circuit 17 and a rechargeable power storage 18. The monitoring circuit 17 may include one or more sensors that monitor one or more components of the pneumatic tool 12. The monitoring circuit 17 may also include a processor and/or a memory device for analyzing and/or storing data relating to usage of the pneumatic tool 12 (e.g., information from the one or more sensors of the monitoring circuit 17). The rechargeable power storage 18 of the electronics 16 supplies power to the monitoring circuit 17. The rechargeable power storage 18 may be embodied as a battery, a capacitor, or any other type of power storage device. It will be appreciated that, in some embodiments, the electronics 16 (including the monitoring circuit 17) may include additional or different components to those described herein (e.g., components typically found in a computing device).

As the motor of pneumatic tool 12 is energized by a pressurized fluid and not by electricity, the pneumatic tool 12 does not have a battery or a direction connection to mains electricity (like an electrically powered tool) that might also be used for charging the rechargeable power storage 18. Instead, the adapter 10 supplies a power signal to the electronics 16 that is used to charge the rechargeable power storage 18. As described further below, the adapter 10 receives a power signal from the charger unit 14 and (after manipulation, in some embodiments) supplies the power signal to the electronics 16 of the pneumatic tool 12. Depending on the electronics 16 of the pneumatic tool 12, the power signal supplied by the adapter may be an alternating current (AC) power signal or a direct current (DC) power signal.

In some embodiments, the adapter 10 may also receive data signals from the electronics 16 of the pneumatic tool 12 (e.g., from the monitoring circuit 17). By way of example, these data signals may contain data associated with the usage of the pneumatic tool 12. For instance, the data signals may contain data relating to at least one of an operating time the pneumatic tool 12, an output speed of the pneumatic tool 12, and an output torque of the pneumatic tool 12. The data signals may contain data related to a single usage session of the pneumatic tool 12, usage of the pneumatic tool 12 over a specific time period, or usage over the entire life of the pneumatic tool 12.

In some embodiments, the adapter 10 may also transmit data signals to the electronics 16 of the pneumatic tool 12 (e.g., to the monitoring circuit 17). By way of example, these data signals may contain data relating to software and/or firmware used by the electronics 16 of the pneumatic tool 12. For instance, the data signals may include a software or firmware update for the electronics 16 included in pneumatic tool 12.

As shown in FIG. 3, the adapter 10 includes a tool connector 34, a charger connector 36, and an adapter circuit 38. The tool connector 34 is configured to interface with the electronics 16 of the pneumatic tool 12 and to communicate electric signals between the electronics 16 of the pneumatic tool 12 and the adapter circuit 38. The charger connector 36 is configured to interface with the charger unit 14 and communicate electric signals between the charger unit 14 and the adapter circuit 38. The adapter circuit 38 is coupled to both the tool connector 34 and the charger connector 36.

In the illustrative embodiment, a housing 32 encloses the tool connector 34, charger connector 36, and adapter circuit 38. The housing 32 may be made from a variety of materials. In the illustrative embodiment, the housing 32 is made from plastic. As mentioned above, the housing 32 generally includes the tool interface 20 and the charger interface 22. In the illustrative embodiment, the tool interface 20 and the charger interface 22 are located on opposite sides of the housing 32. It will be appreciated that, in other embodiments, other configurations for the tool interface 20 and the charger interface 22 are possible.

In the illustrative embodiment, the tool interface 20 is formed to receive a portion of the pneumatic tool 12. In particular, a tool-receiving cavity 48 that is sized to receive an end portion of the pneumatic tool 12 is defined in the tool interface 20. The tool-receiving cavity 48 may be sized to receive a portion of a specific pneumatic tool, a specific category of pneumatic tools, or a variety of pneumatic tools. In some embodiments, the tool interface 20 may be configured to be removably coupled to the pneumatic tool 12.

The charger interface 22 is formed to be received by the charger unit 14. In some embodiments, the charger interface 22 is configured to be removably coupled to the charger unit 14. The charger interface 22 may be formed to be received by a specific charger unit 14, a specific category of charger units 14, or a variety of charger units 14. In the illustrative embodiment, the charger interface 22 includes a battery-terminal rail 50 sized to be received by a battery-terminal slot 52 of the charger unit 14.

In some embodiments, such as that shown in FIGS. 1-3, the housing 32 includes a charger unit lock 54. The charger unit lock 54 includes a latch 56 and a release 58. The charger unit lock 54 is moveable between a locked position and an unlocked position. When the charger unit lock 54 is moved to the locked position, the latch 56 couples to the charger unit 14 such that the adapter 10 is blocked from being removed from the charger unit 14. When the charger unit lock 54 is moved to the unlocked position, the latch 56 uncouples from the charger unit 14 and the adapter 10 may be removed from the charger unit 14. In the illustrative embodiment, the charger unit lock 54 automatically assumes the locked position when the adapter 10 is removably coupled to the charger unit 14. The charger unit lock 54 is moved to the unlocked position when a sufficient force is applied to the release 58.

Figure 4:
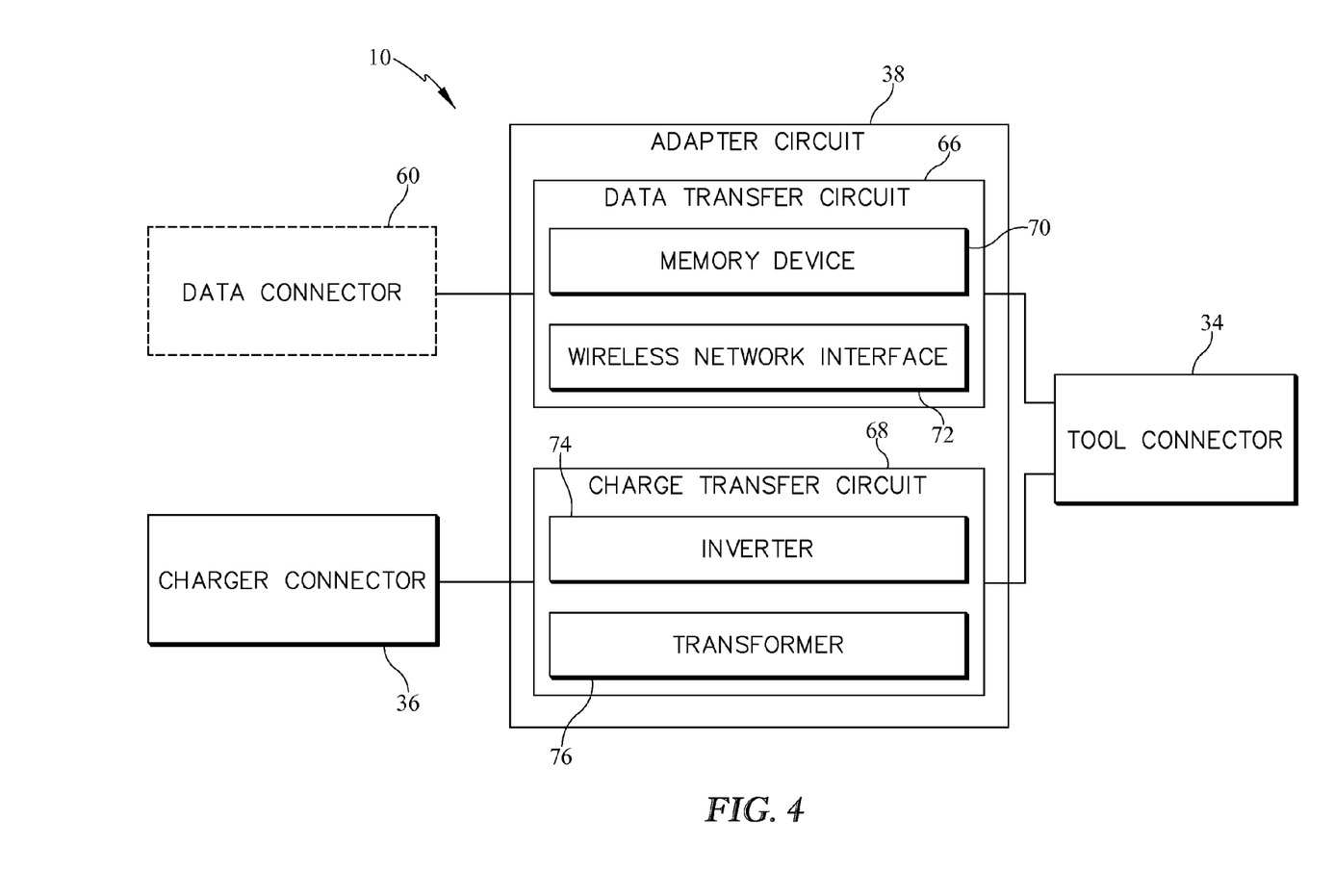
FIG. 4 is a simplified block diagram of various components of the adapter of FIG. 1.

Referring now to FIGS. 3 and 4, the tool connector 34 may be any device(s) capable of communicating a power signal and/or a data signal between the electronics 16 of the pneumatic tool 12 and the adapter circuit 38. In the illustrative embodiment, the tool connector 34 is a Universal Serial Bus (USB) connector configured to communicate both a power signal and a data signal between the electronics 16 of the pneumatic tool 12 and the adapter circuit 38. In other embodiments, the tool connector 34 may communicate only a power signal or only a data signal between the electronics 16 of the pneumatic tool 12 and the adapter circuit 38. In the illustrative embodiment, the tool connector 34 is disposed at the tool interface 20.

The charger connector 36 may be any device(s) capable of communicating a power signal between the charger unit 14 and the adapter circuit 38. In the illustrative embodiment, the charger connector 36 is formed by battery terminals 40. The battery terminals 40 are located on battery-terminal rail 50 and are configured to mate with corresponding charger unit terminals 42 located on the battery-terminal slot 52 of the charger unit 14. The charger unit 14 is configured to receive power from an external source (e.g., mains electricity). The charger unit 14 produces a power signal from the power received from the external source. When the adapter 10 is removably coupled to the charger unit 14, this power signal is transferred through the charger unit terminals 42 to the adapter circuit 38 via the battery terminals 40.

In some embodiments, the adapter 10 may also include a data connector 60, as shown in FIG. 4. The data connector 60 may be coupled to the adapter circuit 38 and configured to communicate the data signals between the adapter circuit 38 and one or more computing devices. By way of example, the data connector 60 may be a USB connector. It will be appreciated that the data connector 60 may be any device(s) capable of communicating a data signal between the adapter circuit 38 and a computing device.

In the illustrative embodiment, the adapter circuit 38 includes a data transfer circuit 66 and a charge transfer circuit 68, as shown in FIG. 4. It is contemplated that, in other embodiments, the adapter circuit 38 may include additional or different circuits and/or components. The data transfer circuit 66 is configured to communicate data signals between the electronics 16 of the pneumatic tool 12 and one or more computing devices (via the tool connector 34 and, possibly, the data connector 60). The charge transfer circuit 68 is configured to communicate power signals between the charger unit 14 and the electronics 16 of the pneumatic tool 12 (via the tool connector 34 and the charger connector 36).

In some embodiments, the data transfer circuit 66 may include a memory device 70. The memory device 70 may be configured to store data associated with the data signals received from the electronics 16 of the pneumatic tool 12 and/or from a computing device. The data stored in the memory device 70 may be communicated to the electronics 16 of the pneumatic tool 12 via the tool connector 34 (in the form of one or more data signals). In some embodiments, the data stored by the memory device 70 may be communicated to one or more computing devices via the data connector 60 (in the form of one or more data signals).

In some embodiments, the data transfer circuit 66 may include a wireless network interface 72. The wireless network interface 72 may be configured to communicate data signals between the adapter 10 (specifically, the adapter circuit 38) and one or more computing devices via a wireless data link. In the illustrative embodiment, data signals produced by the electronics 16 of the pneumatic tool 12 are communicated to the data transfer circuit 66 via the tool connector 34. These data signals are then communicated to one or more computing devices via the wireless network interface 72. Likewise, data signals produced by one or more computing devices are communicated to the data transfer circuit 66 via the wireless network interface 72 and are then communicated to the electronics 16 of the pneumatic tool 12 via the tool connector 34. It is contemplated that, in some embodiments, the wireless network interface 72 may also be used to communicate data signals between the adapter 10 and the electronics 16 of the pneumatic tool 12 (rather than the tool connector 34).

In some embodiments, the charge transfer circuit 68 may include an inverter 74 that is configured to convert a DC power signal received from the charger unit 14 into an AC power signal to be supplied to the electronics 16 of the pneumatic tool 12. The inverter 74 may be any device(s) capable of converting a DC power signal into an AC power signal. It is also contemplated that, in other embodiments, the charge transfer circuit 68 may include a rectifier that is configured to convert an AC power signal received from the charger unit 14 into a DC power signal to be supplied to the electronics 16 of the pneumatic tool 12.

In some embodiments, the charge transfer circuit 68 may include a transformer 76 that is configured to change the magnitude, or amplitude, of a power signal. By way of example, where the power signal received from the charger unit 14 is larger in magnitude than the power signal to be supplied to the electronics 16 of the pneumatic tool 12 (e.g., to the rechargeable power storage 18), the transformer 76 may receive change the magnitude of the power signal. The transformer 76 may be any device(s) capable of changing the magnitude of a power signal.

In some embodiments, the adapter 10 may include an indicator 92 that represents a status of the rechargeable power storage 18 included in the electronics 16 of the pneumatic tool 12. In such embodiments, the charge transfer circuit 68 may be configured to detect the status (e.g., the charge level) of the rechargeable power storage 18 via the tool connector 34. The charge transfer circuit 68 may then communicate the status of the rechargeable power storage 18 via the indicator 92. In some embodiments, the indicator 92 may also be configured to indicate when the rechargeable power storage 18 is non-functional.

In the illustrative embodiment shown in FIGS. 1-3, the indicator 92 is a visual indicator 92 including a number of lights. When the rechargeable power storage 18 stores a minimum charge, none of the lights included in visual indicator 92 are illuminated. As the charge stored by the rechargeable power storage 18 increases, the lights included in the visual indicator 92 illuminate, one by one. The number of illuminated lights may be proportionate to the amount of charge stored by the rechargeable power storage 18. It is contemplated that, in other embodiments, the visual indicator 92 may be a graphical display. In still other embodiments, the indicator 92 may be an audible indicator 92.

As mentioned above, the adapter 10 may be configured to communicate data signals with one or more computing devices. In some embodiments, this communication may occur directly via the data connector 60 or the wireless network interface 72. Additionally or alternatively, this communication between the adapter 10 and one or more computing devices may occur indirectly through one or more computer networks 78, as indicated diagrammatically in FIG. 5 by double-headed arrows 80. The one or more computer network 78 may be embodied as any type of wired and/or wireless network(s) such as a local area network, a wide area network, a publicly available global network (e.g., the Internet), and/or other network. The one or more computer network 78 may include any number of additional devices to facilitate communication between the adapter 10 and one or more computing devices, such as routers, switches, intervening computers, and the like.

Figure 5:
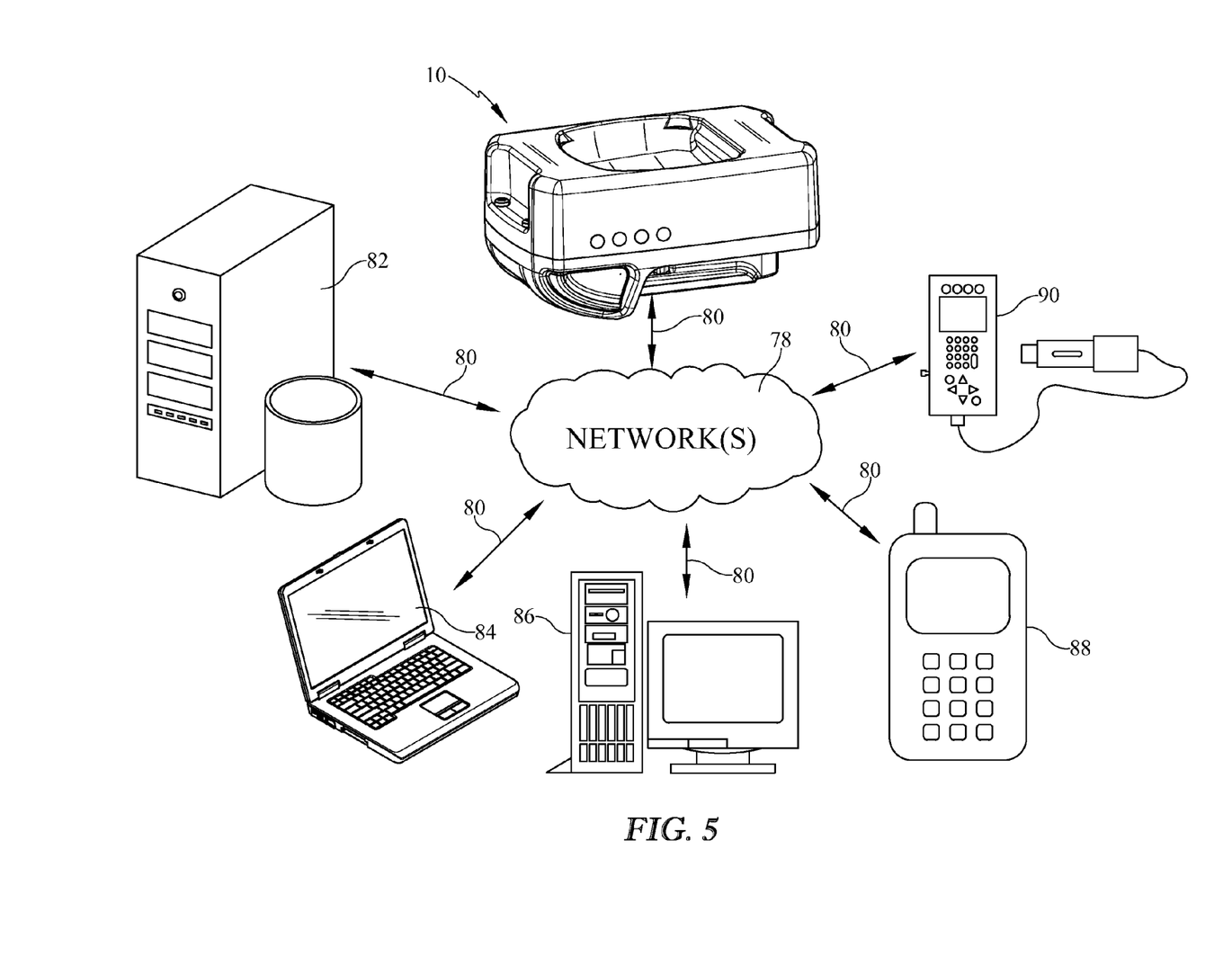
FIG. 5 is a simplified block diagram illustrating the adapter of FIG. 1 communicating with one or more computing devices.

The adapter 10 may be configured to communicate with any type of computing device. For instance, as shown in FIG. 5, the adapter 10 may communicate with at least one of an electronic database 82, a laptop computer 84, a desktop computer 86, a cellular telephone 88, and a dedicated adapter reader 90. The dedicated adapter reader 90 may be any device(s) capable of receiving and or displaying information associated with the data signals. In some embodiments, the dedicated adapter reader 90 may be a portable handheld device. The adapter circuit 38 may be configured to translate data signals received from the electronics 16 of the pneumatic tool 12 into a format that is understandable to one or more computing devices. The adapter circuit 38 may also be configured to translate data signals received from one or more computing devices into a format that is understandable to the electronics 16 of the pneumatic tool 12.

After receiving data signals, the one or more computing devices may display and/or store data associated with the usage of the pneumatic tool 12. This data may be displayed automatically when a computing device receives the data signals, or it may be stored by the computing device and later retrieved by an operator, a customer, a service center, or others. The data may be used to maintain the pneumatic tool 12. For example, the computing devices may monitor the data associated with the usage of the pneumatic tool 12 and suggest scheduled maintenance when specific criteria are met (e.g., when the operating time of the pneumatic tool 12 exceeds a threshold).

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A pneumatic-powered tool comprising:
    a pneumatic motor that is energized by a pressurized fluid supplied to the pneumatic motor through a hose;
    wherein the pneumatic motor is not energized by electricity;
    wherein the pneumatic-powered tool includes an adapter;
    wherein the adapter includes:
    a housing having a tool interface and a charger interface, the tool interface includes a cavity that receives a portion of the pneumatic tool in the cavity, the charger interface shaped to be received by a charger unit that is configured for charging a battery of an electric tool;
    a tool connector disposed at the tool interface that removably couples to electronics of the pneumatic tool;
    a charger connector disposed at the charger interface and configured to be removably coupled to electronics of the charger unit;
    wherein the tool connector is located opposite the charger connector;
    wherein the housing is configured to be supported by the charger unit; and
    an adapter circuit disposed within the housing and coupled to both the tool connector and the charger connector, wherein the adapter circuit is configured to receive a first power signal via the charger connector and to supply a second power signal via the tool connector; and
    wherein the tool connector is configured to supply power to a battery inside the pneumatic tool.

2. The pneumatic-powered tool of claim 1, wherein the second power signal is the first power signal.

3. The pneumatic-powered tool of claim 1, wherein the adapter circuit comprises a transformer, the first power signal has a first magnitude, and the second power signal has a second magnitude that is different than the first magnitude.

4. The pneumatic-powered tool of claim 1, wherein the adapter circuit comprises an inverter, the first power signal is a direct current power signal, and the second power signal is an alternating current power signal.

5. The pneumatic-powered tool of claim 1, wherein the adapter circuit is further configured to receive a first data signal from the electronics of the pneumatic tool via the tool connector and to transmit the first data signal to a computing device.

6. The pneumatic-powered tool of claim 5, wherein the adapter circuit is further configured to receive a second data signal from the computing device and to transmit the second data signal to the electronics of the pneumatic tool via the tool connector.

7. The pneumatic-powered tool of claim 6, wherein the adapter circuit comprises a wireless network interface configured to wirelessly transmit the first data signal to the computing device and to wirelessly receive the second data signal from the computing device.

8. The pneumatic-powered tool of claim 6, wherein the adapter circuit comprises a memory device configured to store data associated with at least one of the first and second data signals.

9. The pneumatic-powered tool of claim 1, wherein the charger interface further includes (i) a latch configured to lock the adapter to the charger unit when the charger interface is received by the charger unit and (ii) a release configured to unlock the adapter from the charger unit when activated.

\* \* \* \* \*